March 24, 1964  V. K. LANGHART  3,126,108
GLASS HANDLING APPARATUS
Filed Sept. 13, 1960  8 Sheets-Sheet 1
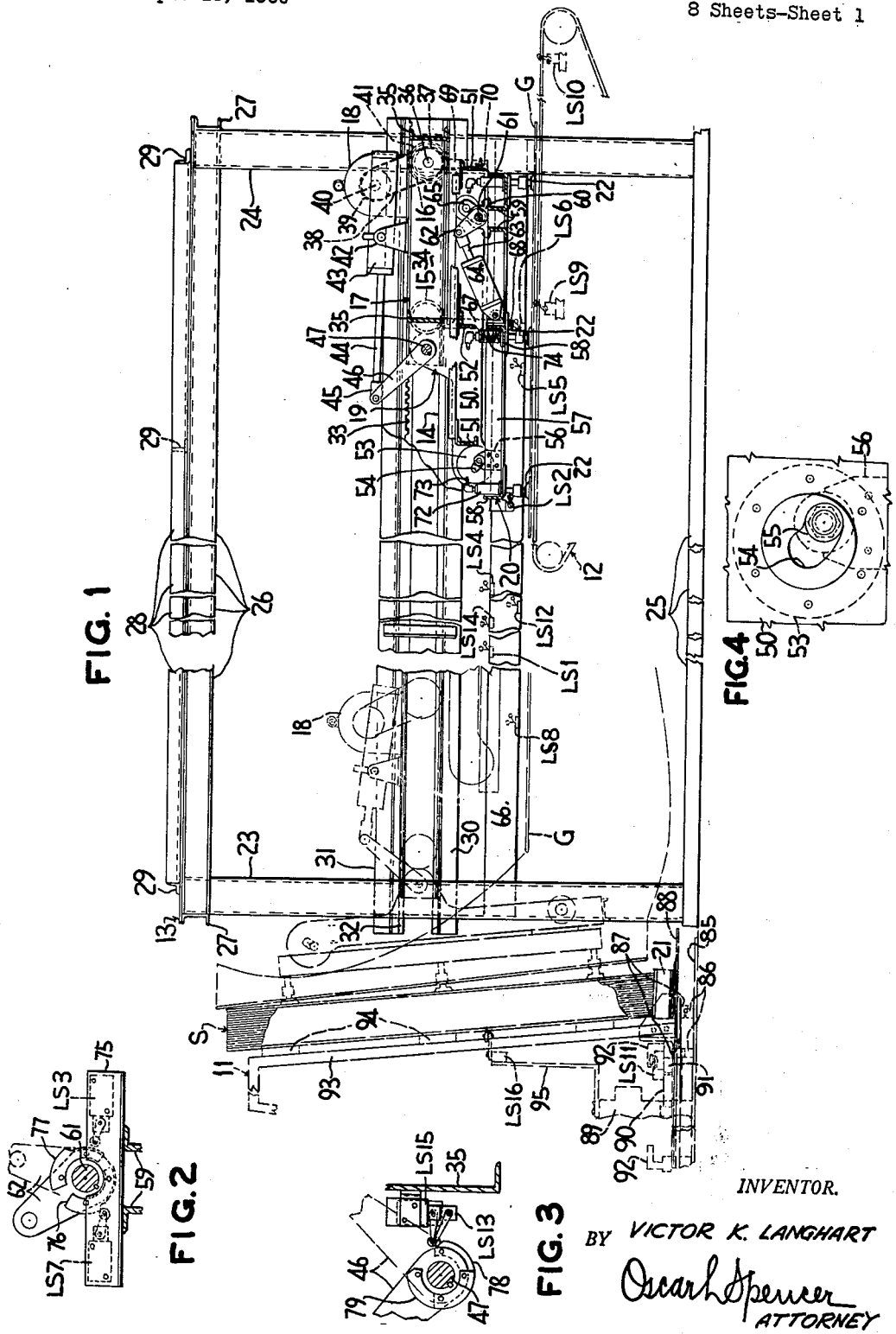
INVENTOR.
BY VICTOR K. LANGHART
Oscar L. Spencer
ATTORNEY March 24, 1964 V. K. LANGHART 3,126,108
GLASS HANDLING APPARATUS
Filed Sept. 13, 1960 8 Sheets-Sheet 3

INVENTOR.
VICTOR K. LANGHART
BY
Oscar H. Spencer
ATTORNEY

March 24, 1964  V. K. LANGHART  3,126,108
GLASS HANDLING APPARATUS
Filed Sept. 13, 1960  8 Sheets-Sheet 4

INVENTOR.
VICTOR K. LANGHART
BY
ATTORNEY

March 24, 1964  V. K. LANGHART  3,126,108
GLASS HANDLING APPARATUS
Filed Sept. 13, 1960  8 Sheets-Sheet 5

FIG. 8
SYMBOLS & LEGEND

LS 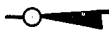 LIMIT SWITCH NORMALLY CLOSED

LS  LIMIT SWITCH NORMALLY OPEN

PB  PUSH BUTTON NORMALLY OPEN

PB  PUSH BUTTON NORMALLY CLOSED

TR-  TIMER CONTACTS-ENERGIZED NORMALLY OPEN, TIME CLOSING

TR-  TIMER CONTACTS-ENERGIZED NORMALLY CLOSED, TIME OPENING

TR-  TIMER CONTACTS DE-ENERGIZED NORMALLY OPEN, TIME OPENING

VSW 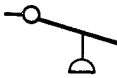 VACUUM SWITCH — NORMALLY OPEN

CR-  RELAY COIL CONTACTS — NORMALLY OPEN

CR-  RELAY COIL CONTACTS — NORMALLY CLOSED

SV 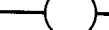 SOLENOID OPERATED VALVE

CR 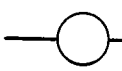 RELAY COIL

TR  TIMING COIL

INVENTOR.
VICTOR K. LANGHART
BY
Oscar L Spencer
ATTORNEY

March 24, 1964  V. K. LANGHART  3,126,108
GLASS HANDLING APPARATUS
Filed Sept. 13, 1960  8 Sheets-Sheet 6

INVENTOR.
VICTOR K. LANGHART
BY
Oscar H. Spencer
ATTORNEY

March 24, 1964  V. K. LANGHART  3,126,108
GLASS HANDLING APPARATUS

Filed Sept. 13, 1960  8 Sheets-Sheet 8

INVENTOR.
VICTOR K. LANGHART
BY Oscar L. Spencer
ATTORNEY

United States Patent Office 3,126,108
Patented Mar. 24, 1964

3,126,108
GLASS HANDLING APPARATUS
Victor K. Langhart, Pittsburgh, Pa., assignor to Pittsburgh Plate Glass Company, Pittsburgh, Pa., a corporation of Pennsylvania
Filed Sept. 13, 1960, Ser. No. 55,663
9 Claims. (Cl. 214—8.5)

This invention relates to a glass handling apparatus and more especially relates to an apparatus for unstacking glass sheets individually from a stack of glass sheets and transferring each individual sheet to a conveyor automatically without any manual control during the complete unstacking of a stack of sheets.

Various apparatuses have been developed for the unstacking of glass sheets from a stack of glass sheets and transferring the individual sheets to a conveyor. An example of this type of apparatus is disclosed and claimed in U.S. Patent No. 2,049,850, granted on August 4, 1936, to W. O. Lytle and E. A. Fusca. Such apparatus utilizes spring mounted vacuum cups to engage and carry glass sheets, and no necessary relationship is provided between an outward and upward movement of the sheet to break the vacuum between the sheet and the stack as the sheet is unstacked.

It is an object of the present invention to provide an apparatus which can unstack individually glass sheets from a stack of glass sheets in an improved manner automatically from a turntable and deposit the sheets on a conveyor by moving a vacuum frame into position and then providing simultaneous upward and outward movement of the outermost glass sheet away from the stack without lifting the entire support that mounts the vacuum frame on a carriage.

It is another object of this invention to provide an apparatus that will automatically unstack individually glass sheets from a stack of glass sheets until the last glass sheet has been removed and then automatically stop the operation of the apparatus until another stack of glass sheets has been moved by the turntable into unstacking position.

These and other objects of the present invention will be apparent to one skilled in the art from the description which follows of the preferred embodiment of the apparatus of this invention when taken in conjunction with the drawings in which similar parts are designated by the same numeral and in which:

FIG. 1 is an elevation of the apparatus, partially broken away, and showing the carriage, tilting frame and vacuum frame in full lines at the unloading position and in phantom lines at the unstacking position;

FIG. 2 is a fragmentary sectional view of the tilting frame and the crank arm forming part of the support for one end of the vacuum frame to the tilting frame showing cam plates and limit switches operated by the cam plates to indicate whether the vacuum frame is parallel to or inclined with respect to the tilting frame;

FIG. 3 is a fragmentary sectional view of the carriage and tilting frame showing cam plates and limit switches operated by the cam plates to indicate whether the tilting frame is horizontal or upright with a slight angle of inclination;

FIG. 4 is a fragmentary enlarged view of the vacuum frame and the tilting frame showing support construction using cam followers and cam plates for mounting the other end of the vacuum frame to the tilting frame;

Figure 5A:
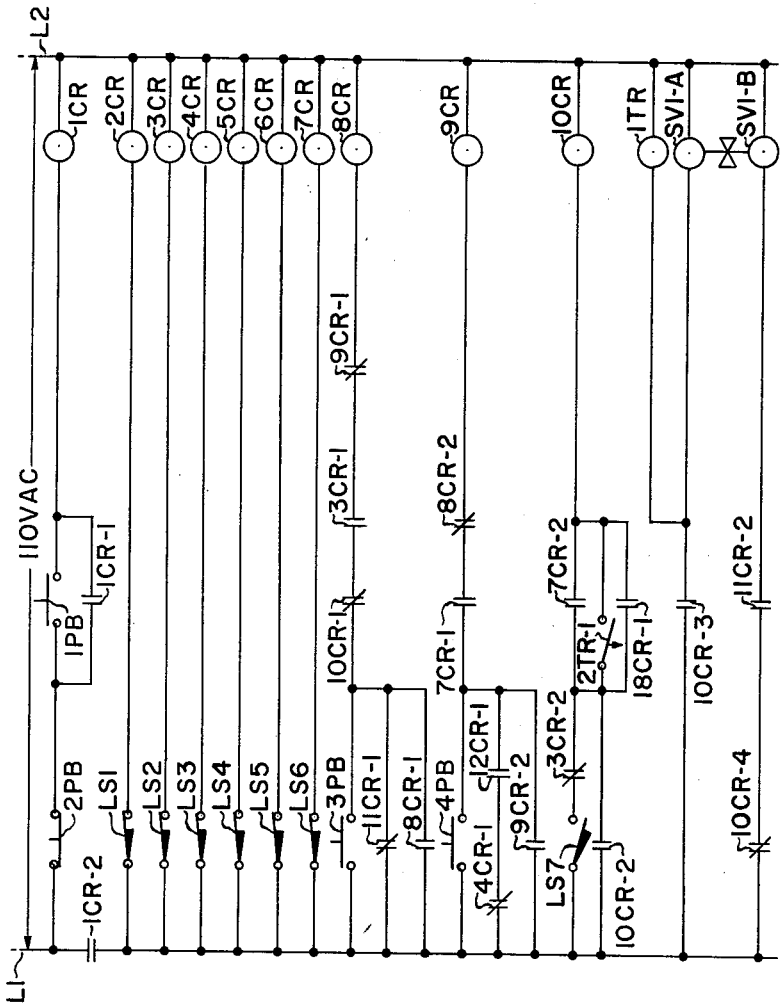
Figure 5B:
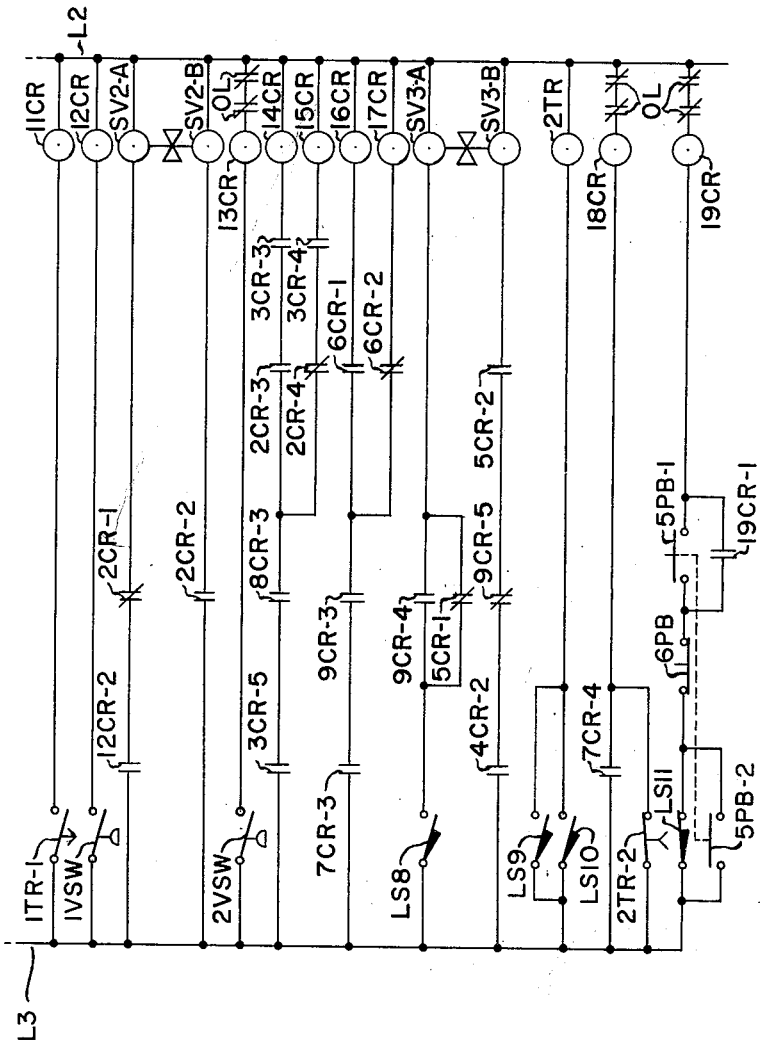
Figure 6:
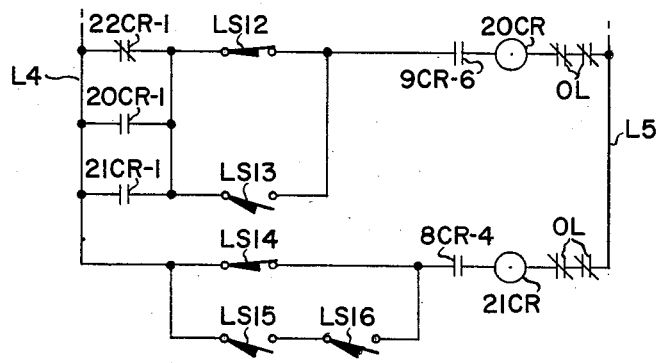
Figure 7:
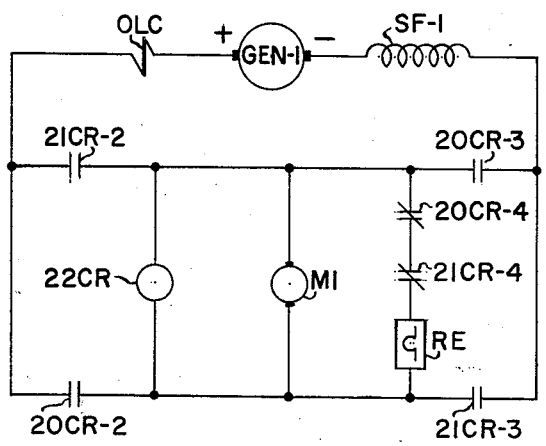
Figure 9:
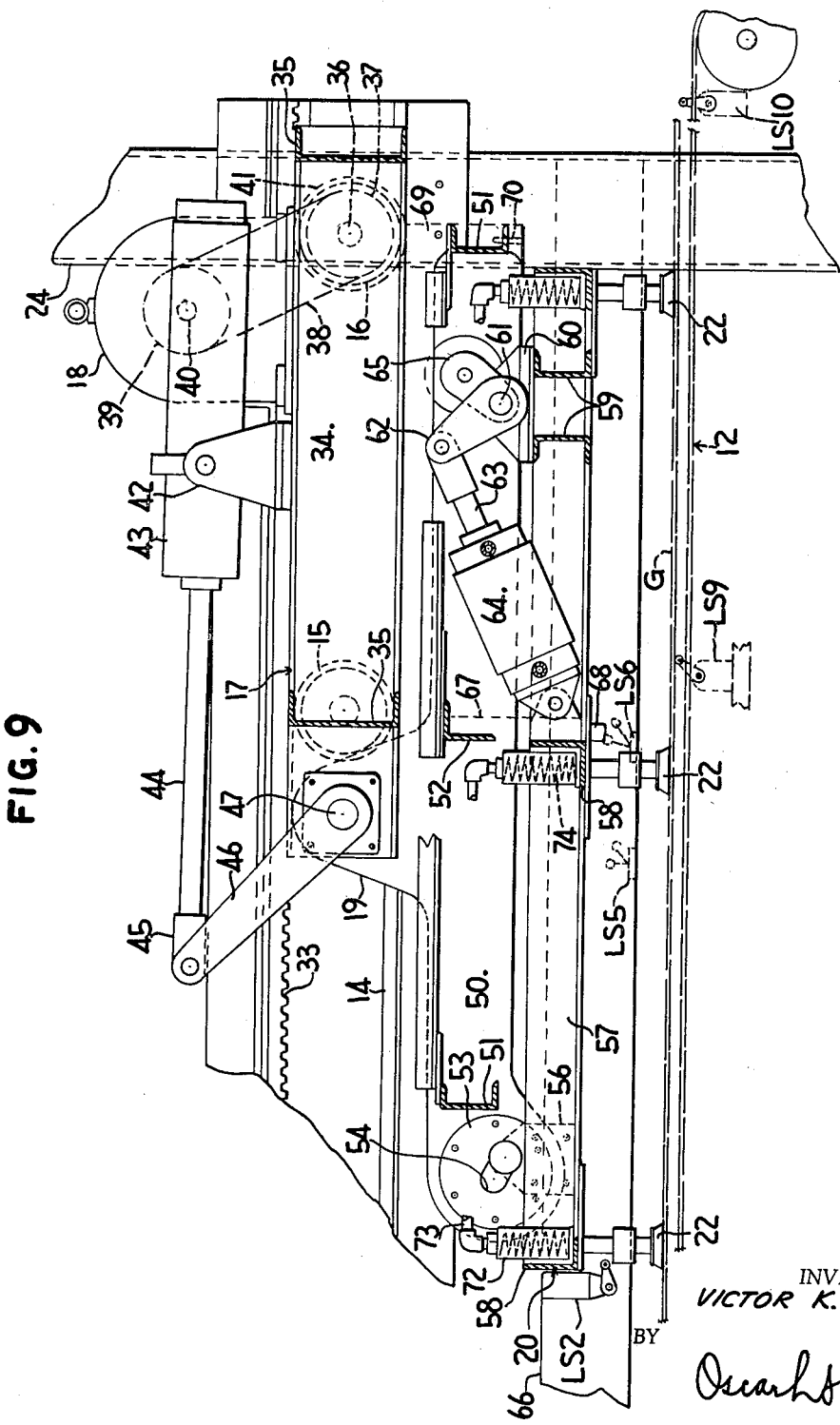
Figure 10:
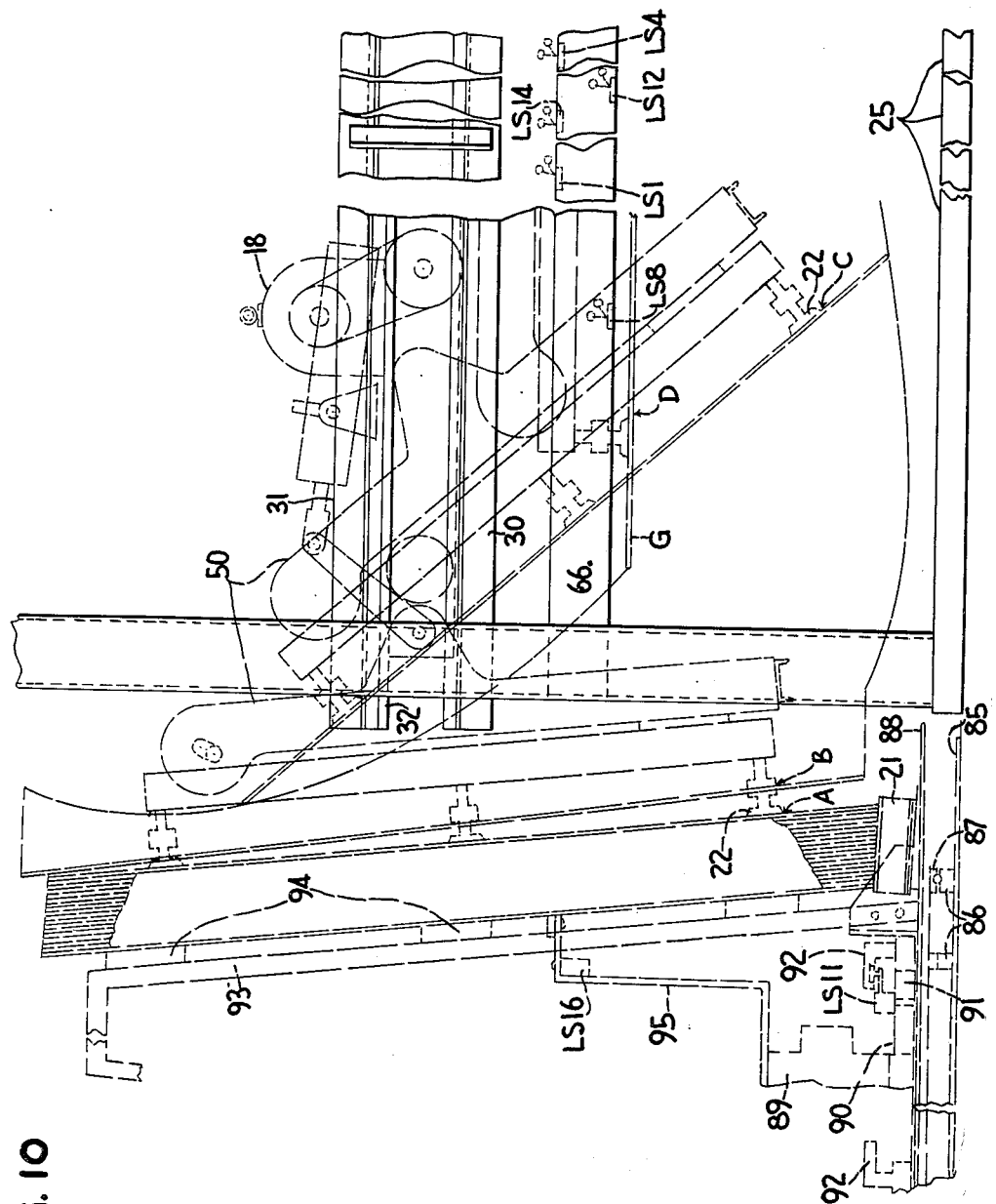
Figure 11:
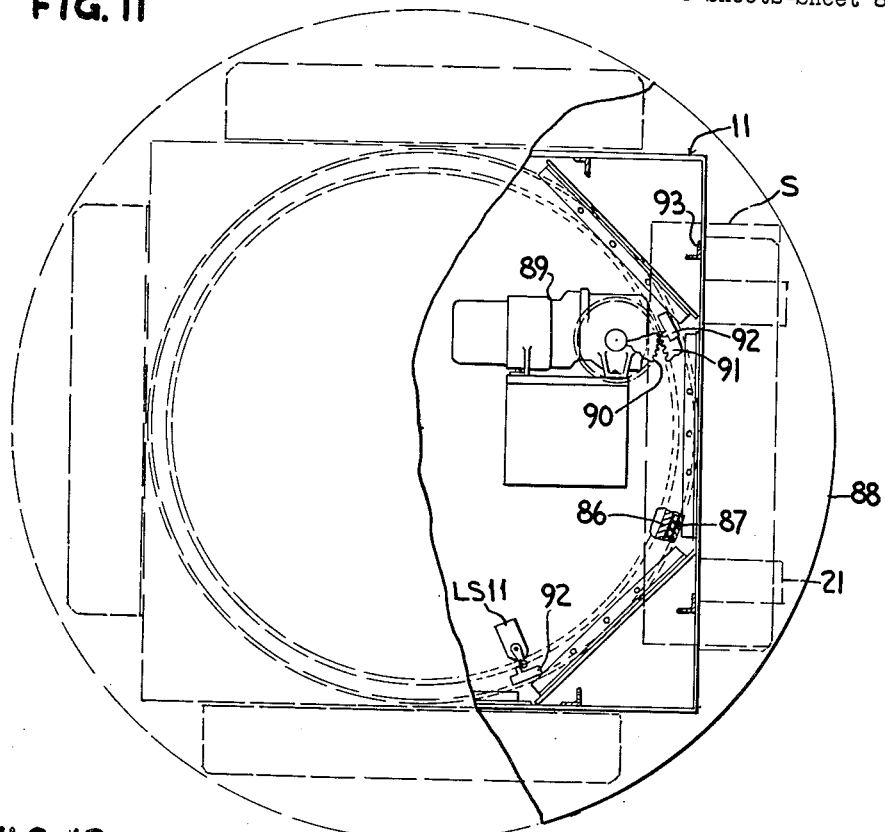
Figure 12:
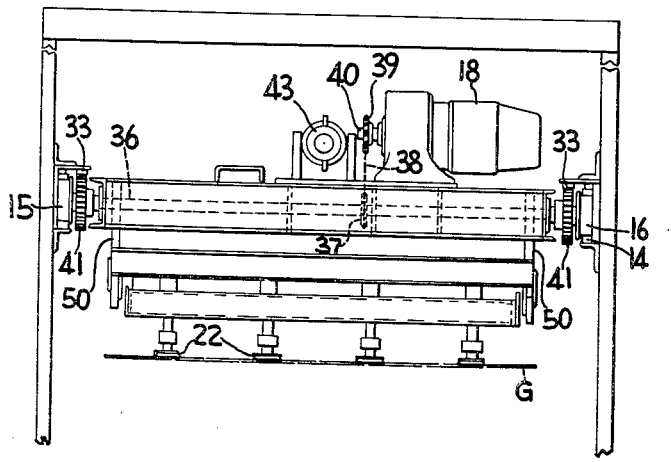

FIGS. 5a and 5b comprise a schematic drawing of part of electrical circuitry used in the apparatus;

FIG. 6 is a schematic drawing of other electrical circuitry that operates the relays that determine the forward and reverse travel of the motor drive for the carriage;

FIG. 7 is a schematic drawing of part of the electrical circuitry to operate the drive motor for the carriage in forward or reverse direction as determined by the relays whose coils are shown in FIG. 6;

FIG. 8 is a definitive representation of the symbols and legends used in FIGS. 5a, 5b, 6 and 7;

FIG. 9 is a fragmentary enlarged view in elevation of the carriage tilting frame and vacuum frame of FIG. 1;

FIG. 10 is a fragmentary enlarged view in elevation of the apparatus shown in FIG. 1 illustrating three positions of the tilting frame, the unloading position being shown in full lines and the intermediate position and an unstacking position being shown in phantom lines;

FIG. 11 is a plan view of a turntable for supporting stacks of glass to be handled by the carriage, tilting frame and vacuum frame of the apparatus; and FIG. 12 is an end elevation view of the vacuum frame and tilting frame.

The preferred embodiment of the apparatus of the present invention includes a turntable generally indicated at 11 and having a pair of inclined sides, a conveyor generally indicated at 12 having a horizontal top run, a supporting structure generally indicated at 13 that supports a pair of horizontal rails 14 which support a pair of wheels 15 and a pair of wheels 16 which are rotatably mounted on a carriage generally indicated at 17. A motor 18 is mounted on and moves carriage 17 between an unloading position and an unstacking position. The carriage 17 supports a tilting frame 19 for pivotal movement about a horizontal axis which is transverse to the direction of travel of carriage 17. A vacuum frame generally indicated at 20 is connected near opposite ends of vacuum frame 20 to frame 19 by supporting means that permits vacuum frame 20 to be moved between a position A (FIG. 10) in which it is parallel to tilting frame 19 to a closer position B in which one transverse end of frame 20 is closer to frame 19 than at the other transverse end so that, when frame 19 is upright with a slight angle of inclination facing and parallel to one inclined side of turntable 11, movement of frame 20 closer to frame 19 moves upwardly frame 20 but the bottom end of frame 20 moves farther away from turntable 11 than does the upper end of vacuum frame 20. The turntable 11 has both stack-receiving inclined sides constructed with a pair of spaced stools 21 which are mounted so that their top rubber-covered surfaces are downwardly inclined away from the stack-receiving inclined sides. As a result, when stack S rests on one set of stools 21, the outermost sheet G when being moved horizontally away from turntable 11 will clear the outermost top surface portion of stools 21.

The movement of vacuum frame 20, which has sets of vacuum cups 22 mounted on it, relative to tilting frame 19 is provided by a power-driven means as is the pivotal movement of frame 19 with respect to carriage 17. The movement of carriage 17 from the unloading position to the unstacking position is initiated upon the unloading of the glass sheet from frame 20 but the full travel is accomplished only if there is at least one glass sheet G remaining on turntable 11 on the stack-receiving side facing carriage 17. This control prevents the movement of tilting frame 19 and vacuum cups 20 into the position for unstacking where they would interfere with the rotation of turntable 11 through 180 degrees for the presentation of another stack of glass sheets mounted on the other stack-receiving side of turntable 11.

The supporting structure 13 includes a pair of vertical channel irons 23 and a pair of vertical channel irons 24 mounted on a base 25. The channel irons 23 and 24 on each side of the apparatus are connected at the top by horizontal channel irons 26. The opposite channel irons 23 and 24 are connected by transverse horizontal irons 27. Angle irons 28 and transverse angle irons 29 are mounted on channel irons 26 and also form part of supporting structure 13. The rails 14 support wheels 15 and 16. Each of rails 14, which support flanged wheels 15 and 16, is supported by an angle iron 30 which is mounted at its ends on channel irons 23 and 24. Angle irons 31 are similarly mounted at their ends on channel irons 23 and 24. Each of angle irons 31 supports a hold-down plate 32. Each of plates 32 is thus mounted above one of rails 14 so that wheels 15 and 16 that ride on rails 14 are in abutment with and held down by plates 32.

The angle irons 31 also support a pair of horizontal racks 33 that face downwardly. The carriage 17 comprises longitudinal channel irons 34 which are connected at their ends to transverse channel irons 35. The channel irons 34 are transversely spaced from each other and rotatably support a shaft 36 by bearings (not shown). A sprocket 37 is keyed on shaft 36 on which are journalled wheels 16. The shaft 36 is driven by a chain 38 which is driven by a sprocket 39 keyed on a shaft 40 of motor 18. Gears 41 are keyed on the ends of shaft 36 and mesh with racks 33. With this construction the operation of motor 18 results in the movement of carriage 17 between the unloading and stacking positions. The wheels 15 are journalled on channel irons 34.

A pair of brackets 42 is mounted on carriage 17 and by bushings (not shown) pivotally mount the trunnions of an air cylinder 43 having a piston rod 44 on whose free end is mounted a knuckle 45. A crank arm 46 is pivotally connected to knuckle 45 and is keyed on a shaft 47 which is mounted on its ends on channel irons 34 of carriage 17. The piston rod 44 as shown in FIGS. 1 and 9 is in the extended position when carriage 17 is at the unloading position and is in the retracted position when carriage 17 is at the unstacking position.

The tilting frame 19 includes a pair of plates 50 which are transversely spaced apart and connected by a pair of channel irons 51 and an angle iron 52. The intermediate portion of each of plates 50 has an upper extension through which shaft 47 extends. The shaft 47 is keyed to plates 50 so that rotation of shaft 47 by the operation of air cylinders 43 results in the pivotal movement of tilting frame 19 about the axis of rotation of shaft 47. This movement of tilting frame 19 is between a horizontal position shown at the right hand portion of FIG. 1 to an upright position with a slight angle of inclination shown in phantom at the left hand portion of FIG. 1.

One end of each plate 50 of tilting frame 19 supports a cam plate 53 having a cam slot 54 as seen in FIGS. 1 and 4. A cam follower 55 is in each cam slot 54. The cam followers 55 are mounted on supports 56. The vacuum frame 20 includes transversely spaced angle irons 57 which are connected at their ends and intermediate their ends by angle irons 58. Adjacent one end angle iron 58 is a pair of channel irons 59 which are connected at their ends to channel irons 57. The cam support brackets 56 are mounted on channel irons 57 near the other end angle iron 58. The pillow blocks 60 are mounted on channel irons 59 of vacuum frame 20 and extend upwardly between plates 50 of tilting frame 19. The pillow blocks 60 rotatably mount a shaft 61 on which is keyed a crank arm 62 which is pivotally connected to a rod 63 of an air cylinder 64. The cylinder 64 is pivotally mounted on a bracket mounted on the intermediate angle iron 58.

The piston rod 63 is shown in its retracted position in the right hand portion of FIGURE 1. When air cylinder 64 is operated to extend rod 63, crank arm 62 is rotated clockwise (as viewed in FIGS. 1 and 9) to rotate shaft 61 clockwise. A link 65 is pivotally mounted by a bearing (not shown) on each of plates 50 of tilting frame 19. The free end of each link 65 is keyed on shaft 61 so that the clockwise rotation of shaft 61 pivots links 65 clockwise (as viewed in FIGS. 1 and 9) about their pivotal mounting on plates 50. This movement occurs when carriage 17, tilting frame 19 and vacuum frame 20 are at the unstacking position shown at the left hand portion of FIG. 1. This movement resulting from the extension of piston rod 63 moves shaft 61 upwardly and away from turntable 11 when carriage 17 is at this unstacking position. This relative movement between vacuum frame 20 and tilting frame 19 due to the clockwise movement of pivotal movement of links 65 also moves cam followers 55 in slots 54 of cam plates 53 so that vacuum frame 20 at the top portion is similarly moved upwardly but the degree of movement to the right (as viewed in FIGS. 1 and 10) is less than that of the lower end of vacuum frame 20 with tilting frame 19 upright at the unstacking position.

The rear vertical channel irons 23 and 24 of supporting structure 13 support a channel iron 66 on which are mounted seven limit switches which are described later. One of channel irons 34 of carriage 17 has mounted on it a tripper bracket 67 adjacent one of wheels 15. The bottom end of bracket 67 has mounted on it a dog or tripper 68 which will trip four of the limit switches mounted on channel iron 66 during the travel of carriage 17 between unloading and unstacking positions. The same channel iron 34 of carriage 17 also has mounted on it a bracket 69 adjacent one of wheels 16. The bracket 69 supports a dog or tripper 70 which will trip the other three limit switches mounted on channel iron 66 during the travel of carriage 17 between the unloading and unstacking positions.

The chambers of air cylinder 43 are connected by piping (not shown) to a double-solenoid, spring-centered, maintained contact, 4-way valve (not shown except schematically in composite FIG. 5) which has its inlet connected to a pressurized air source (not shown) and one of its outlets connected to the atmosphere. The chambers of air cylinder 64 are connected by piping (not shown) with a 4-way valve (which is shown schematically in composite FIG. 5) whose spool is movable between two positions by the operation of momentary pilot valves operated by the energization of two solenoids which are referred to later.

The vacuum frame 20 includes three rows of vacuum cups 22 with the rows longitudinally spaced with respect to one another. Each of the rows of vacuum cups 22 includes four vacuum cups 22 which are spaced with respect to one another transversely of the direction of travel of carriage 17. Each vacuum cup 22 includes a conventional rubber cup with an opening in its top and which is mounted on the bottom of a tube that extends through the rubber cup and upwardly through a housing 72 mounted on angle irons 58. Each tube is connected to a hose 73. Each of hoses 73 is connected to a double-solenoid, spring-centered, maintained contact, 3-way valve (shown schematically in composite FIG. 5) so that when one of the solenoids of this valve is energized vacuum cups 22 are in communication with a vacuum source (not shown) and when the other solenoid is energized vacuum cups 22 are in communication with a pressurized air source (not shown). Of course, when neither of the solenoids is energized the spool of the valve is positioned so that cups 22 are not in communication with either the vacuum source or the air source.

A spring 74 is in each housing 72. The spring 74 surrounds the tube of vacuum cups 22 so that vacuum cup 22 is resiliently urged away from tilt frame 19. Whenever vacuum frame 20 abuts a sheet of glass in a stack the vacuum cups 22 are moved toward tilt frame 19. This movement in the opposite direction due to the urging of springs 74 results in the closing of a limit switch as described later.

As seen in FIG. 2 the channel irons 59 of vacuum frame 19 support a bracket 75. The crank 62 has mounted on it a cam 76 and a cam 77 which are constructed and positioned so that cam 76 trips one of the two switches mounted on bracket 75 when cam 62 is in a position shown in full lines whereas cam 77 trips the other limit switch mounted on bracket 75 when crank 62 is in a position shown in phantom. These limit switches are referred to later.

The channel iron 35 of carriage 17 adjacent wheels 15 supports a pair of limit switches which are referred to later. As seen in FIG. 3 crank arm 46 has mounted on it a cam 78 and a cam 79 which are constructed and positioned so that cam 78 trips one of the two limit switches mounted on channel iron 35 when crank arm 46 is in the position shown in full lines whereas cam 79 trips the other limit switch when crank arm 46 is in position shown in phantom.

The conveyor 12 is preferably of the multi-belt type and includes two pulleys one of which is driven by a motor (not shown). Two limit switches are mounted on fixed supports (not shown) between belts of conveyor 12. One limit switch is positioned so that it is tripped whenever glass sheet G is released by vacuum frame 20 at the unloading position of carriage 17. The other limit switch is positioned so that it is closed when conveyor 12 moves the glass sheet away from the unloading position and remains closed by the glass sheet G until the trailing edge of sheet G has almost passed off of conveyor 12.

The turntable 11 is mounted on a fixed support 85 on which are mounted a pair of rings 86 that support through ball bearings a pair of base rings 87 mounted on a circular plate 88 of turntable 11 that has a large central opening. A motor 89 is mounted on fixed support 85 and rotates a pinion gear 90 which meshes with a ring gear 91 mounted on circular plate 88 at the central opening. One of base rings 87 is integral with ring gear 91. Two dogs 92 are mounted on ring gear 91 diametrically opposite each other. A limit switch, which is referred to in detail later, is mounted on fixed support 85 and is tripped by one of dogs 92 when turntable 11 has a stack S of glass sheets facing carriage 17. When turntable 11 is rotated 180 degrees from this position the other dog 92 trips this limit switch.

The turntable 11 includes two inclined side frames 93 and two vertical end frames (not shown) and these four frames are connected to one another by cross beams as partially indicated at the top of turntable 11 in FIG. 1. The inclined side frames 93 support three horizontal wooden planks 94 which have their outer faces lined with felt for abutment by stack S. The base of inclined frames 93 and the end frames defines a rectangular area which extends outwardly of circular plate 88 so that the radius of the clearance line for turntable 11 is greater than the radius of plate 88.

A bracket 95 is mounted on fixed support 85 and bracket 95 supports a limit switch which is positioned between planks 94 so that this limit switch is tripped by a glass sheet resting on stools 21 and against planks 94 of one inclined side 93 of turntable 11. When turntable 11 is rotated through 180 degrees none of the side or end frames trips this limit switch, but at the completion of the 180 degrees of rotation the switch is tripped by a glass sheet if there is one on the other inclined side which now faces conveyor 12. This limit switch is shown with the bracket 95 mounted on motor 89 for convenience although preferably it would be mounted directly on fixed support 85.

In the foregoing description various limit switches have been referred to. There are 16 limit switches which are designated LS1 through LS16. The limit switches LS1, LS4 and LS14 of the fork type are mounted on channel iron 66 so that they are tripped by dog 70 during the movement of carriage 17 between unloading and unstacking positions. The limit switches LS5, LS6, LS8 and LS12 are also of the fork type and are mounted on channel iron 66 so that they are tripped by dog 68 during the movement of carriage 17 between unloading and unstacking positions.

When carriage 17 is at the unloading position switch LS1 is closed and is tripped open shortly before carriage 17 reaches the unstacking position where cups 22 on vacuum frame 20 would engage the outer glass sheet G of stack S of glass sheets mounted on turntable 11. Of course, switch LS1 is tripped closed during the return movement of the carriage 17 from the unstacking position to the unloading position.

The switch LS4 is closed when carriage 17 is at the unloading position but is tripped open when carriage 17 is moving toward the unstacking position. This opening of switch LS4 occurs when carriage 17 reaches a position where cylinder 43 can be operated to pivot tilting frame 19 from the horizontal position to the upright position without vacuum frame 20 hitting conveyor 12.

The switch LS5 is open when carriage 17 is in the unloading position and is tripped closely shortly after carriage 17 leaves this position in its forward travel to the unstacking position. During the return or reverse movement of carriage 17 from the unstacking position to the unloading position switch LS5 is tripped open shortly before the unloading position is reached. The switch LS6 is open when carriage 17 is at the unloading position and is tripped closed when carriage 17 starts its movement toward the unstacking position. The important factor is that switch LS6 is tripped open during the reverse movement of carriage 17 when the latter reaches the unloading position.

The switch LS8 is closed when carriage 17 is at the unloading position. It is tripped open during the forward movement of carriage 17 to the unstacking position and more important is the fact that it is tripped closed during the reverse movement of carriage 17 to initiate the pivotal movement of tilting frame 19 from the upright position to the horizontal position. This closing of switch LS8 occurs when it is safe to pivot tilt frame 19 so that glass sheet G on it will not hit stack S. Until switch LS8 is tripped closed the line of travel of the top edge and the bottom edge of sheet G removed from stack S by vacuum frame 20 is horizontal and then the closing of switch LS8 changes the direction of movement of the top and bottom edges of sheet G as indicated in the first part of their movements by phantom lines in FIG. 1.

The switch LS12 is open when carriage 17 is at the unloading position but is tripped closed during the forward travel of carriage 17 to the unstacking position. The switch LS12 is located so that it is tripped open during the reverse travel of carriage 17 at a point of the latter travel where tilt frame 19 should be in the horizontal position to clear conveyor 12. This opening of switch LS12 insures that the continued reverse movement of carriage 17 will not occur through this limit switch unless switch LS13 is now closed.

The switch LS14 is closed when carriage 17 is at the unloading position. It is tripped open when carriage 17 is in its forward direction of movement toward the unstacking position. This opening of switch LS14 occurs at a position of travel of carriage 17 when frame 19 should be in the upright or vertical position with the usual slight angle of inclination so that switch LS15 is closed to continue the forward travel. Of course, switch LS14 is tripped closed during the return travel of carriage 17 to the unloading position.

The limit switch which is tripped open when vacuum cups 22 are moved against springs 74 by the forward movement of vacuum frame 20 against stack S is normally closed limit switch LS2.

The limit switch LS9 which is tripped closed when glass sheet G is released from vacuum frame 20 onto conveyor 12 is a normally open switch LS9. The switch which is tripped by moving glass sheet G on conveyor 12 as it reaches the end of its travel on conveyor 12 is normally open switch LS10.

The limit switch which is tripped open by cam 77 is normally closed limit switch LS3. The switch LS3 is tripped open when vacuum frame 20 is moved from the position parallel to frame 19 to the nonparallel position where it is closer to frame 19. The switch which is tripped closed by cam 76 is a normally open switch LS7. This occurs when crank arm 62 is at the position shown in full lines in FIG. 2, i.e., when frame 20 is parallel to frame 19 because piston rod 63 is retracted.

The limit switch which is tripped closed by cam 78 is normally open switch LS13 so that when frame 19 is in the horizontal position switch LS13 is closed. When frame 19 is pivoted from the horizontal position to the upright position cam 79 trips closed the other switch, which is mounted on channel iron 35 as mentioned above, and this switch is normally open switch LS15.

The switch which is tripped open by dogs 92 is normally closed switch LS11. The switch mounted on bracket 95 is normally open switch LS16 and it is tripped closed by the innermost glass sheet of stack S facing conveyor 12 as described earlier.

Referring to composite FIG. 5, electrical lines L1 and L2 are connected to a 110-volt A.C. source (not shown). The various circuits connected to lines L1 and L2 contain either a coil of a relay, a coil of a starter for a motor, a coil of a timer relay or a solenoid of a solenoid-operated 4-way valve which is of the spring centered, maintained-contact type or of the momentary pilot-operated type. The coils of the relays are designated 1CR, 2CR, 3CR, 4CR, 5CR, 6CR, 7CR, 8CR, 9CR, 10CR, 11CR, 12CR, 13CR, 14CR, 15CR, 16CR, 17CR, 18CR and 19CR. The coils of the timer relays are designated 1TR and 2TR and these relays are of the off-delay type. The solenoids are designated SV1-A, SV1-B, SV2-A, SV2-B, SV3-A and SV3-B.

The relay having coil 1CR has normally open contacts 1CR-1 and 1CR-2. The relay having coil 2CR has a normally closed contact 2CR-1, normally open contacts 2CR-2 and 2CR-3 and a normally closed contact 2CR-4. The relay having coil 3CR has a normally open contact 3CR-1, a normally closed contact 3CR-2 and normally open contacts 3CR-3, 3CR-4, and 3CR-5. The relay having coil 4CR has a normally closed contact 4CR-1 and a normally open contact 4CR-2. The relay having coil 5CR has a normally closed contact 5CR-1 and a normally open contact 5CR-2. The relay having coil 6CR has a normally open contact 6CR-1 and a normally closed contact 6CR-2. The relay having coil 7CR has normally open contacts 7CR-1, 7CR-2, 7CR-3, and 7CR-4.

The relay having coil 8CR has a normally open contact 8CR-1, a normally closed contact 8CR-2 and normally open contacts 8CR-3 and 8CR-4. The relay having coil 9CR has a normally closed contact 9CR-1, normally open contacts 9CR-2, 9CR-3, and 9CR-4, and normally closed contacts 9CR-5 and 9CR-6. The relay having coil 10CR has a normally closed contact 10CR-1, normally open contacts 10CR-2 and 10CR-3 and a normally closed contact 10CR-4. The relay having coil 11CR has a normally closed contact 11CR-1 and a normally open contact 11CR-2. The relay having coil 12CR has normally open contacts 12CR-1 and 12CR-2. The relay having coil 13CR is a starter for a motor (not shown) that operates a vacuum pump (not shown) mounted on carriage 17, which provides a vacuum to cups 22 whenever solenoid SV1-A is energized. The relays having coils 14CR, 15CR, 16CR and 17CR have normally open contacts which are in D.C. electrical circuits (not shown) that are in parallel with each other but are in series with variable rheostats that are in parallel with each other and which are in series with normally open contacts, in parallel with each other, of the relays having coils 20CR and 21CR to control whether or not current flows through and the flow rate through the field winding of a D.C. generator GEN-1 (FIG. 7). This arrangement of electrical circuitry is well known to those skilled in the art and is similar to, with simplification, that shown in the left-hand portion of FIG. 23 of assignee's copending application Serial No. 11,261, entitled "Glass Cutting Apparatus" and filed by Jay J. Brand on February 26, 1960.

The relay having coil 18CR is a starter coil relay for the motor that operates conveyor 12 and in addition has a contact 18–1CR which is in series with coil 10CR for the reason which is explained later. The relay having coil 19CR is a starter coil relay for motor 89.

The timer relay having coil 1TR has a deenergized normally open, time-opening contact 1TR-1. Timer relay having coil 2TR type has a deenergized normally open, time-opening contact 2TR-1 and an energized normally closed, time-opening contact 2TR-2.

Each of the three circuits containing coils 13CR, 18CR and 19CR has in series a pair of normally closed contacts OL of motor overload coil relays to protect the vacuum pump motor, the motor for conveyor 12 and motor 89 as is conventional in the art.

The coil 1CR is in a circuit in series with a normally open pushbutton switch 1PB and a normally closed pushbutton switch 2PB. This circuit is connected to lines L1 and L2. In parallel with switch 1PB and in series with switch 2PB and coil 1CR is contact 1CR-1 to provide a holding circuit. The electrical line L1 is connected to electrical line L3 by contact 1CR-2. All of the other circuits are connected to line L1 through line L3, which is energized only when contact 1CR-2 is closed. The circuits containing coils 2CR, 3CR, 4CR, 5CR, 6CR and 7CR also contain in series limit switches LS1, LS2, LS3, LS4, LS5 and LS6, respectively.

The coil 8CR is in series with contacts 3CR-1, 9CR-1 and 10CR-1 and a normally open pushbutton switch 3PB. The contacts 8CR-1 and 11CR-1 are in subcircuits in parallel with each other and in parallel with switch 3PB but are in series with coil 8CR and contacts 3CR-1, 9CR-1 and 10CR-1.

The coil 9CR is in series with contacts 7CR-1 and 8CR-2 and a normally open pushbutton switch 4PB. A subcircuit contains contacts 4CR-1 and 12CR-1 and is in parallel with a subcircuit containing contact 9CR-2 and in parallel with switch 4PB and these two subcircuits are in series with coil 9CR and contacts 7CR-1 and 8CR-2.

The coil 10CR is in series with contacts 3CR-2 and 7CR-2 and limit switch LS7. A subcircuit containing contacts 10CR-2 is in parallel with switch LS7 and contact 3CR-3 and in series with contacts 7CR-2 and coil 10CR. Contacts 2TR-1 and 18CR-1 are in subcircuits with each other and in parallel with contact 7CR-1 but in series with coil 10CR and with contact 3CR-2 and switch LS7 and, of course, with contact 10CR-2.

The solenoid SV1-A is in series with contact 10CR-3. The coil 1TR is in parallel with solenoid SV1-A but in series with contact 10CR-3. The solenoid SV1-B is in series with contacts 10CR-4 and 11CR-2. The solenoids SV1-A and SV1-B are the two solenoids of the 3-way valve that communicates hoses 73 alternatively with the vacuum source and the pressurized air source. When solenoid SV1-A is energized the valve has its spool positioned so that vacuum is provided to cups 22 and when solenoid SV1-B is energized pressurized air is fed to cups 22.

The coil 11CR is in series with contact 1TR-1. The coil 12CR is in series with a normally open vacuum switch 1VSW, which is in communication with hose 73 connecting one of vacuum cups 22 to the 3-way valve that has solenoids SV1-A and SV1-B so that when the pressure in hose 73 is sufficiently low, i.e., when solenoid SV1-A is energized, coil 12CR is energized because switch 1VSW closes.

The solenoid SV2-A is in series with contact 2CR-1 and 12CR-2 whereas solenoid SV2-B is in series with contact 2CR-2. The solenoids SV2-A and SV2-B are the solenoids of the pilot valves that control the position of the spool of the 4-way valve which directs compressed air to and exhausts pressurized air from the chambers of air cylinder 64. When solenoid SV2-A is energized piston rod 63 is moved outwardly to rotate shaft 61 clockwise. With frames 19 and 20 in an upright position with a slight angle of inclination parallel to that of stack S, this movement results in the upward movement of frame 20 along with movement of it to the right. When solenoid SV2-B is energized rod 63 is retracted to move frame 20 to its position where it is parallel with frame 19.

The coil 13CR is in series with a normally open switch 2VSW which is closed whenever the pressure in the vacuum source between the vacuum pump and the valve having solenoids SV1-A and SV1-B is above a predetermined maximum. As a result, when the pressure closes switch 2VSW, coil 13CR is energized. The coil 13CR is in a starter coil relay for a motor which operates the vacuum pump that removes air from the vacuum source.

The coil 14CR is in a subcircuit containing contacts 2CR-3 and 3CR-3 and this subcircuit is in parallel with a subcircuit containing coil 15CR and contacts 2CR-4 and 3CR-4 and both subcircuits are connected to line L2 directly but are connected through contacts 3CR-5 and 8CR-3 to line L3.

A subcircuit containing in series coil 16CR and contact 6CR-1 is in parallel with a subcircuit containing in series coil 17CR and contact 6CR-2. Both of these subcircuits are connected directly to line L2 and are connected to line L3 through contacts 7CR-3 and 9CR-3.

The solenoid SV3-A is in a circuit in series with contact 9CR-4 and a normally open limit switch LS8 while contact 5CR-1 is in parallel with contact 9CR-4 but in series with switch LS8 and solenoid SV3-A. The solenoid SV3-B is in a circuit in series with contacts 4CR-2, 5CR-2 and 9CR-5.

The solenoids SV3-A and SV3-B are the two solenoids of the 4-way valve which directs the pressurized air to and exhausts pressurized air from the two chambers of air cylinder 43. When solenoid SV3-A is energized piston rod 44 extends to move frame 19 to the horizontal position. When solenoid SV3-B is energized piston rod 44 retracts to move frame 19 to the upright position.

The coil 2TR is in series with normally open limit switches LS9 and LS10 which are in parallel with each other.

The coil 18CR is in series with overload contacts OL and in series with contact 7CR-4 and contact 2TR-2 which are in parallel with each other. The coil 18CR is the coil of the motor starter coil relay which starts the motor for conveyor 12 when coil 18CR is energized.

The coil 19CR is in series with overload contacts OL and a normally open contact 5PB-1, a normally closed pushbutton switch 6PB and a normally closed limit switch LS11. The pushbutton switch which has contact 5PB-1 also has a normally open contact 5PB-2 which is in parallel with switch LS11 but is in series with switch 6PB, contact 5PB-1 and coil 19CR. The contact 19CR-1 is in parallel with contact 5PB-1 but is in series with coil 19CR, switch 6PB, switch LS11 and contact 5PB-2. The coil 19CR is the coil of the starter coil relay which starts motor 89 when coil 19CR is energized.

Referring to FIGS. 6 and 7 electrical circuits containing coils 20CR and 21CR are connected to a D.C. source (not shown) by electrical lines L4 and L5. The relay having coil 20CR has normally open contacts 20CR-1, 20CR-2 and 20CR-3 and a normally closed contact 20CR-4. The relay having coil 21CR has normally open contacts 21CR-1, 21CR-2 and 21CR-3 and a normally closed contact 21CR-4.

The circuit containing coil 20CR is in series with a pair of overload contacts OL, contact 9CR-6, a normally closed contact 22CR-1 of a relay having a coil 22CR (shown in FIG. 7), and limit switch LS12. The contacts 20CR-1 and 21CR-1 are in parallel with each other and with contact 22CR-1 but are in series with switch LS12, contact 9CR-6, coil 20CR and the pair of contacts OL. The limit switch LS13 is in parallel with switch LS12 but in series with contacts 20CR-1, 21CR-1 and 22CR-1, which are in parallel with each other, contact 9CR-6, coil 20CR and contacts OL.

The overload contacts OL which are in series with coil 20CR as well as in series with the overload contacts OL. These contacts OL are contacts of a motor overload relay that has its coil OLC (FIG. 7) in series with the armature M1 of the D.C. motor 18 that drives carriage 17. As will be apparent to one skilled in the art these contacts OL are present to deenergize whichever one of coils 20CR and 21CR is energized whenever the flow of current through armature M1 of motor 18 is too great, because coil OLC then will move the core of the overload relay to open these contacts OL.

The circuit containing coil 21CR is in series with the pair of overload contacts, as mentioned above, contact 8CR-4 and switch LS14. The switches LS15 and LS16 are in series with each other, are in parallel with switch LS14, and are in series with contact 8CR-4, coil 21CR and the pair of overload contacts OL. As will be apparent from the description of operation which follows, the energization of coil 20CR results in the operation of motor 18 to move carriage 17 forward from the unloading position to the unstacking position whereas the energization of coil 21CR results in the operation of motor 18 in the reverse direction to move carriage 17 from the unstacking position to the unloading position.

Referring to FIG. 7 the armature of a D.C. generator GEN-1 is driven by an A.C. motor. The generator GEN-1 provides a constant D.C. voltage which may be one of two predetermined voltages. The voltage provided by generator GEN-1 is dependent upon the rate of current flow through the generator field winding. This rate depends on the rheostat through which the current also flows. If either coil 14CR or coil 16CR is energized a normally open contact of the relay, with which one of these is associated, closes so that current can flow through one of the rheostats to provide one rate of current flow through the generator field winding. If either coil 15CR or coil 17CR is energized a normally open contact of the relay, with which one of these is associated, closes so that current can flow through the other rheostat to provide another rate of flow of current through the generator field winding. As mentioned above, the copending application indicates how these normally open contacts and rheostats can be arranged in circuits with the generator field winding to control either one of two rates of current flow through the field winding to provide one or another constant voltage by generator GEN-1.

The generator GEN-1 provides the D.C. voltage to a circuit having in series overload coil OLC, contact 20CR-2, armature M1 of motor 18, contact 20CR-3 and the series field SF-1 of motor 18. The contact 21CR-2 is in a subcircuit in parallel with contact 20CR-2 and armature M1 and contact 21CR-3 is in a subcircuit in parallel with contact 20CR-3 and armature M1. The contacts 21CR-2 and 21CR-3 are in series with coil OLC, armature M1 and series field SF-1. The coil 22CR is in parallel with armature M1 of motor 18. With this arrangement of circuitry current will flow through armature M1 in one direction when contacts 20CR-2 and 20CR-3 are closed and will flow through armature M1 in the opposite direction when contacts 21CR-2 and 21CR-3 are closed. In both instances current will flow through the coil 22CR.

In parallel with armature M1 is a subcircuit containing a resistor Re and normally closed contacts 20CR-4 and 21CR-4. When either 21CR-2 and 21CR-3 or 20CR-2 and 20CR-3 are closed, contacts 20CR-4 and 21CR-4 are open. However, whenever the closed pair of contacts, either 21CR-2 and 21CR-3 or 20CR-2 and 20CR-3, opens contacts 20CR-4 and 21CR-4 will then close so that current flows through resistor Re as a conventional safety measure.

Operation

Assume that the drive motor for the rotation of the armature of generator GEN-1 is operating and D.C. current is provided by a circuit (not shown) to flow current through the shunt field of motor 18. An operator momentarily closes pushbutton switch 1PB to energize coil 1CR thereby closing contacts 1CR-1 and 1CR-2. Although pushbutton switch 1PB opens the energization of coil 1CR continues because now closed contact 1CR-1 provides a holding circuit for coil 1CR. The energization of coil 1CR continues so that line L3 is now energized because contact 1CR-2 is now closed. If at any time it is desired to deenergize line L3 the holding circuit is opened by an operator opening pushbutton switch 2PB momentarily to deenergize coil 1CR thereby opening contacts 1CR-1 and 1CR-2.

Assume carriage 17 is at the unloading position as shown in FIG. 1. Switches LS1, LS2 and LS3 are closed so that coils 2CR, 3CR and 4CR are energized. The switches LS4, LS5 and LS6 are open so that coils 5CR, 6CR and 7CR are not energized.

The switch LS7 is closed by cam 76 because vacuum frame 20 is in its parallel relationship with tilting frame 19 as explained earlier. Because coil 3CR is energized contact 3CR-2 is open and because coil 7CR is not energized contact 7CR-2 is open so that coil 10CR is not energized through this circuit. Because no glass sheet G has been placed yet on conveyor 12 neither switch LS9 or switch LS10 is closed. Thus, coil 2TR is not energized so that contact 2TR-1 is open. Also, because coil 2TR is not energized contact 2TR-2 is open. With coil 7CR not energized contact 7CR-4 is open so that coil 18CR is not energized. The coil 18CR is also not energized through contact 2TR-2 because the latter is open. Accordingly, contact 18CR-1 is open. Because contacts 7CR-2, 2TR-1 and 18CR-1 are all open coil 10CR is not energized and contact 10CR-2 is open.

Because coil 10CR is not energized contact 10CR-1 is closed. Because coil 3CR is energized contact 3CR-1 is closed. Because coil 9CR is not energized, as explained below, contact 9CR-1 is closed. Before coil 8CR is energized contact 8CR-1 is open. The switch 3PB is in its normally open position. The coil 11CR is not energized because contact 1TR-1 is open in view of the fact that coil 1TR is not energized because contact 10CR-3 is open as coil 10CR is not energized. Because coil 11CR is not energized contact 11CR-1 is closed. Accordingly, when contact 1CR-2 closes current flows through contacts 11CR-1, 10CR-1, 3CR-1 and 9CR-1 and coil 8CR. This energizes coil 8CR to close contact 8CR-1 which is in the holding circuit for coil 8CR.

Because coil 7CR is not energized contact 7CR-1 is open so that coil 9CR cannot be energized at this time. Of course, as soon as coil 8CR is energized, contact 8CR-2 opens so that this is an additional reason why coil 9CR cannot be energized. As soon as carriage 17 moves away from the unloading position through the energization of coil 8CR as described later switch LS6 closes to energize coil 7CR thereby opening contact 7CR-1 but prior to this contact 8CR-2 opens through the energization of coil 8CR so that coil 9CR still cannot be energized. Furthermore, the holding circuit is inoperative because contact 9CR-2 is open. Also, contacts 4CR-1 and 12CR-1 are open so that the circuit containing these contacts cannot energize coil 9CR.

Because coil 10CR is not energized, as described above, contact 10CR-3 is open so that solenoid SV1-A and coil 1TR are not energized. Although contact 10CR-4 is closed, because coil 10CR is not energized, contact 11CR-2 is open because coil 11CR is not energized as explained above. Thus solenoid SV1-B is not energized. Accordingly, neither the vacuum source nor the pressurized air source is in communication with vacuum cups 22. Because none of hoses 73 is in communication with the vacuum source switch 1VSW is open so that coil 12CR is not energized. Thus, contacts 12CR-1 and 12CR-2 are open. The contact 12CR-1 is in series with coil 9CR and is one of the reasons that coil 9CR is not now energized. Because contacts 2CR-1 and 12CR-2 are open solenoid SV2-A is not energized. The solenoid SV2-B is energized because contact 2CR-2 is closed. Thus, the 4-way valve controlled by solenoids SV2-A and SV2-B has its spool located so that piston rod 63 is retracted and as a result vacuum frame 20 is parallel to tilt frame 19.

Because the vacuum source has not been depleted of its air by the vacuum pump, switch 2VSW is closed and coil 13CR becomes energized when line L3 becomes energized. The motor then is operated until the pressure in the vacuum source decreases until switch 2VSW opens.

Because coils 2CR, 3CR and 8CR are energized and because coils 6CR, 7CR and 9CR are not energized when line L3 becomes energized, contacts 2CR-3, 3CR-3, 3CR-5 and 8CR-3 close to energize coil 14CR. Although contact 3CR-4 is closed, contact 2CR-4 is open so that coil 15CR is not energized. Although contact 6CR-2 is closed, coil 17CR is not energized because contacts 7CR-3 and 9CR-3 are open. The coil 16CR is not energized because contacts 7CR-3, 9CR-3 and 6CR-1 are open.

Because switch LS8 is closed and contact 5CR-1 is closed solenoid SV3-A is energized. Although contact 9CR-4 is open this contact is not necessary at this time to energize solenoid SV3-A. The contacts 4CR-2 and 9CR-5 are closed but contact 5CR-2 is open. Thus, solenoid SV3-B is not energized. With solenoid SV3-A energized piston rod 44 of cylinder 43 is extended as shown in FIG. 1 so that tilting frame 19 is in the horizontal position.

It is assumed further for the beginning of operation that stack S of glass sheets G is on both inclined sides of turntable 11. The turntable is also assumed to be disposed so that switch LS11 has been opened by one of dogs 92. Thus, coil 19CR is not energized and motor 89 is not operating.

The switches LS12 and 13 are open and closed, respectively. Because coil 9CR is not energized contact 9CR-6 is open and thus coil 20CR is not energized. The switch LS14 is closed. The contact 8CR-4 is closed because coil 8CR is energized. The switch LS16 is closed because it is assumed that stack S of glass sheets is on the inclined side 93 facing conveyor 12 but switch LS15 is open. Current cannot flow through the subcircuit containing switches LS15 and LS16 but does flow through switch LS14 and closed contact 8CR-4 so that coil 21CR is energized.

Because coil 21CR is energized contacts 21CR-2 and 21CR-3 are closed and contact 21CR-4 is open. Current flows through armature M1 of motor 18 and coil 22CR. Thus, contact 22CR-1 is open. Although 21CR-1 is closed current cannot flow through coil 20CR to energize it because contact 9CR-6 is open as mentioned above. The flow of current through armature M1 of motor 18 is in the direction such that motor 18 is operated to move carriage forward, i.e., from the unloading position toward the unstacking position. Because coil 14CR rather than coil 16CR is energized the flow of current through the generator field winding is at the higher rate so that generator GEN-1 provides the greater constant voltage for the circuit of FIG. 7. As a result, motor 18 operates at the faster speed.

As carriage 17 moves away from the unloading position switch LS6 is tripped closed and shortly thereafter switch LS5 is tripped closed. The closing of switches LS6 and LS5 results in the energization of coils 7CR and 6CR, respectively. The contacts 7CR-1, 7CR-2, 7CR-3 and 7CR-4 close upon the energization of coil 7CR. The closing of the first three contacts has no effect on the coils with which they are associated in circuits because other contacts are open. However, when contact 7CR-4 closes coil 18CR is energized so that the motor for conveyor 12 starts to operate. The subsequent energization of coil 6CR results in the closing of contact 6CR-1 and the opening of contact 6CR-2 but because contact 9CR-3 is open coils 16CR and 17CR are not energized.

When moving carriage 17 passes beyond conveyor 12 switch LS4 is tripped closed to energize coil 5CR thereby opening contact 5CR-1 for the deenergization of solenoid SV3-A and closes contact 5CR-2 for the energization of solenoid SV3-B. As a result air cylinder 43 is operated to retract piston rod 44 to move frame 19 from the horizontal position to the upright position with a slight angle of inclination.

The retraction of piston rod 44 moves crank arm 46 about its pivotal axis thereby moving cam 78 away from switch LS13 and moving cam 79 to trip switch LS15. As a result switch LS13 opens and switch LS15 closes. Because contact 9CR-6 is open, switch LS13 when it was closed did not energize coil 20CR. The closing of switch LS15 has no immediate effect because coil 21CR is already energized in view of the fact that switch LS14 is closed. However, as explained below, switch LS14 opens shortly thereafter and with switch LS15 now closed the energization of coil 21CR will continue until contact 8CR-4 opens.

During the forward travel of moving carriage 17 switches LS12 and LS14 are closed and opened, respectively, in that order. The closing of switch LS12 has no effect at this time because contact 9CR-6 is open. The opening of switch LS14 does not result in the deenergization of coil 21CR, because switch LS15 had already closed as described above. Of course, if air cylinder 43 had failed to operate to tilt frame 19 from the horizontal position to the upright position further forward travel of carriage 17 should be stopped; otherwise, vacuum frame 20 would not be in the inclined position with a slight angle of inclination that is equal to the slight angle of inclination of stack S of glass sheets G. In other words, if switch LS15 had not closed because vacuum frame 20 had not been moved around to the proper upright position further forward travel of carriage 17 could cause damage to stack S and to the apparatus. Of course, so long as the apparatus functions properly frames 19 and 20 will be moved from the horizontal position to the upright position and thus switch LS15 will be closed before switch LS14 is opened to continue operation of motor 18.

During the continued movement of carriage 17 the switch LS1 is tripped open to deenergize coil 2CR. This results in the closing of contacts 2CR-1 and 2CR-4 and the opening of contacts 2CR-2 and 2CR-3. The opening of contact 2CR-2 results in the deenergization of solenoid SV2-B. The closing of contact 2CR-1 does not result at this time in the energization of coil SV2-A because contact 12CR-2 is open. The opening of contact 2CR-3 and the closing of contact 2CR-4 results in the deenergization of coil 14CR and the energization of coil 15CR. As explained above, when coil 15CR is energized this results in the flow of current through the other rheostat that has a greater electrical resistance and is in series with the generator field winding of generator GEN-1 so that a smaller current flow now passes through the generator field winding. As a result, generator GEN-1 provides the lower constant voltage to motor 18 and carriage 17 is moved forward but at a crawl speed rather than at the initial fast speed.

As carriage 17 crawls forward switch LS8 is tripped open. Of course, solenoid SV3-A is not affected because it was not energized when contact 1CR-2 closed because of open contact 9CR-4. Also contact 5CR-1 opened when coil 5CR was energized by the closing of switch LS4 during the earlier forward travel of carriage 17 so that by this route, the closing of switch LS8 cannot energize solenoid SV3-A.

When vacuum cups 22 abut the outer glass sheet G of stack S further forward crawling travel of carriage 17 is opposed by stack S so that vacuum cups 22 are moved in the opposite direction against springs 74. As a result, one of the collars on the tubes of cups 22 trips switch LS2 to open it. This results in the deenergization of coil 3CR to open contacts, 3CR-1, 3CR-3, 3CR-4, and 3CR-5 and to close contact 3CR-2.

The opening of contact 3CR-1 results in the deenergization of coil 8CR so that contact 8CR-3 opens when contacts 3CR-3, 3CR-4 and 3CR-5 open. As a result, coil 15CR is deenergized. The coil 14CR is already deenergized. No current can flow through the generator field winding of generator GEN-1. The deenergization of coil 8CR results also in the opening of contact 8CR-1 in its holding circuit and the closing of contact 8CR-2 which is in series with coil 9CR. The contact 8CR-4 opens to deenergize coil 21CR thereby opening contacts 21CR-1, 21CR-2 and 21CR-3 so that current no longer flows through armature M1 of motor 18 and so that current now flows through the circuit containing resistor Re until the voltage between the terminals of armature M1 is dissipated. The forward travel of carriage 17 stops because the operation of motor 18 ceases.

Because inclined frame 20 is still parallel to inclined frame 19 switch LS7 is closed as mentioned above. The contact 7CR-2 was closed when switch LS6 was tripped as carriage 17 left the unloading position to energize coil 7CR. Thus, the closing of contact 3CR-2 results in the energization of coil 10CR. The contact 10CR-1 opens so that this is an additional reason for the deenergization of coil 8CR. The contact 10CR-2 of the holding circuit for coil 10CR closes to maintain the energization of coil 10CR until contact 7CR-2 opens or until contact 2TR-1 or contact 18CR-1 opens, if either one is closed at the time that contact 7CR-2 opens.

The energization of coil 10CR closes contact 10CR-3 to energize coil 1TR and solenoid SV1-A and opens contact 10CR-4 so that now both contacts in series with solenoid SV1-B are open. The energization of coil 1TR results in the closing of contact 1TR-1 to energize coil 11CR for the closing of contact 11CR-2; however, contact 10CR-4 is now open so that solenoid SV1-B is not energized.

The energization of solenoid SV1-A operates the valve with which it is associated so that the vacuum source is placed in communication with hoses 73 and thus vacuum cups 22, which now abut outer glass sheet G of stack S. The energization of solenoid SV1-A and thus the engagement of vacuum cups 22 of glass sheet G continues until coil 10CR is deenergized. Coil 10CR is deenergized either when switch LS6 is open upon the arrival of carriage 17 at the unloading position to open contact 7CR-2 or later if one of contacts 2TR-1 and 18CR-1 is still closed when contact 7CR-2 opens.

When the vacuum source is placed in communication with hoses 73 the decrease in pressure in hoses 73 results in the closing of switch 1VSW to energize coil 12CR thereby closing contacts 12CR-1 and 12CR-2. Although contacts 7CR-1 and 8CR-2 are closed the closing of contact 12CR-1 does not result now in the energization of coil 9CR because contact 4CR-1 is open with coil 4CR energized. The closing of contact 12CR-2 however, results in the energization of solenoid SV2-A because contact 2CR-1 closed when coil 2CR was deenergized. The contact 2CR-1 closed when switch LS1 was opened to change the speed of forward travel of carriage 17 by motor 18 from the fast speed to the crawl speed.

The energization of solenoid SV2-A results in the operation of air cylinder 64 so that piston rod 63 moves outwardly to move crank arm 62 about the axis of shaft 61 thereby pivoting link 65 to move that end of vacuum frame 20 closer to tilting frame 19. At the same time this movement results in the movement upwardly of the other end of upright vacuum frame 20 so that cam follower 55 moves in slot 54 to move that end of frame 20 also closer to tilting frame 19 but by a lesser amount. This results in the movement of the engaged glass sheet G of stack S away from the next glass sheet at the bottom and near the top. However, because the horizontal component of motion is greater at the bottom than at the top the combination of this motion with the vertical component of movement results in the positioning of the outer glass sheet so that it is moved to the position shown in FIG. 1 in phantom where the top rear marginal portion of engaged sheet abuts the top outer margin of the next glass sheet G of stack S. The pair of stools on which stack S rests has their top surfaces inclined as mentioned above. Because the movement of the bottom portion of sheet G from stack S is outwardly as well as upwardly, the bottom edge of the engaged sheet rapidly moves away from the top surface of stool 21 during the motion of frame 20 relative to frame 19.

During the pivotal movement of crank arm 62 cam 76 moves away from switch LS7 so that switch LS7 opens and then cam 77 moves against switch LS3 to open it. The opening of switch LS3 results in the deenergization of coil 4CR for the closing of contact 4CR-1 and the opening of contact 4CR-2. When contact 4CR-1 closes coil 9CR is now energized to initiate the reverse operation of motor 18 as explained below. The contact 9CR-2 closes upon the energization of coil 9CR to provide a holding circuit that includes now closed contacts 7CR-1 and 8CR-2.

The opening of contact 4CR-2 occurs upon the deenergization of coil 4CR and the energization of coil 9CR opens contact 9CR-5 so that solenoid SV3-B, that was energized to pivot tilting frame 19 from the horizontal position, is now deenergized. However, solenoid SV3-A is not energized at this time so that the valve, with which these two solenoids are associated, has its spool moved only to the center position so that frame 19 remains in its upright position. The solenoid SV3-A is not energized at this time because switch LS8 was opened during the forward travel of carriage 17. The contact 9CR-4 is now closed. The contact 5CR-1 is open because coil 5CR was energized when switch LS4 was tripped closed during the forward travel of carriage 17.

The coil 9CR, when energized, opens contact 9CR-1 to prevent energization of coil 8CR which must be energized for a forward travel of carriage 17 by motor 18. The energization of coil 9CR results in the fast speed reverse drive of motor 18 for the return travel of carriage 17 for the following reason. The energization of coil 9CR closes contacts 9CR-3 and 9CR-4. The closing of contact 9CR-3 results in the energization of coil 16CR rather than coil 17CR because contact 6CR-1 is closed whereas contact 6CR-2 is open. The coil 6CR was energized when switch LS5 was colsed shortly after carriage 17 left its unloading position. As mentioned earlier, the energization of coil 16CR results in the flow of current through the rheostat having a lesser electrical resistance so that a greater current flows through the generator field winding of generator GEN-1 to provide the greater constant voltage to the electrical circuit shown in FIG. 7. As a result, when contact 9CR-6 closes upon the energization of coil 9CR to energize coil 20CR for the closing of contacts 20CR-1, 20CR-2 and 20CR-3 and the opening of contact 20CR-4 current flows through armature M1 in the opposite direction to the previous flow and, of course, flows through series field winding SF-1 in the same direction as before. Thus, motor 18 is operated in a reverse direction to move carriage 17 in the reverse direction from the unstacking position to the unloading position at high speed. The coil 22CR is energized at the same time that the armature M1 has current flowing through it so that contact 22CR-1 opens but contact 20CR-1 closes thereby maintaining coil 20CR energized.

Shortly after the start of the reverse travel of carriage 17 switch LS8 is tripped closed to initiate the energization of solenoid SV3-A because contact 9CR-4 is closed. As a result, air cylinder 43 is operated to extend rod 44 for pivotal movement of crank arm 46 to move frame 19 back to the horizontal position. During this pivotal movement of crank arm 46 switch LS15 opens and at the return travel of crank arm 46 switch LS13 closes. The opening of switch LS15 has no effect because coil 21CR was deenergized when contact 8CR-4 opened. The switch LS15 is closed during the forward travel of carriage 17 in the next cycle before switch LS14 is opened also during the forward travel.

The closing of switch LS13 indicates that tilt frame 19 has been returned to the horizontal position so that when vacuum frame 20 is returned to the position in which it is parallel to frame 19 sheet G engaged by frame 20 will be in a plane above the plane of the top of conveyor 12. Of course, it is necessary that frames 19 and 20 be in this position prior to their arrival at the vertical transverse plane at the tail end of conveyor 12; otherwise sheet G will be moved into abutment with conveyor 12 and be broken. Before carriage 17 reaches this position where frames 19 and 20 must be horizontal switch LS12 is tripped open and coil 20CR will be deenergized to stop motor 18 unless switch LS13 has been closed by the movement of frame 19 to the horizontal position.

Before switch LS12 is tripped open during the reverse travel of carriage 17 several other things occur. One event is the tripping closed of switch LS1 that results in the return of frame 20 to the parallel position with respect to frame 19 as described below.

During this return travel of carriage 17 switch LS1 is tripped closed and this occurs preferably while cylinder 43 is being operated to return tilt frame 19 to the horizontal position. When switch LS1 closes coil 2CR is energized to open contact 2CR-1 for the deenergization of solenoid SV2-A which, when energized, had operated air cylinder 64 for the movement of frame 20 closer toward frame 19 as described above. The contact 2CR-2 closes to energize solenoid SV2-B thereby resulting in the movement of the spool of the 4-way valve with which solenoids SV2-A and SV2-B are associated so that air cylinder 64 is operated to retract piston rod 63 for the rotation of shaft 61 in a counterclockwise direction. This moves frame 20 into a parallel relationship with respect to frame 19.

The contacts 2CR-3 and 2CR-4 close and open, respectively, upon the energization of coil 2CR and the closing of contact 2CR-3 has no immediate effect. The energization of coil 14CR will be possible later through contact 2CR-3 upon the energization of coil 8CR to close contact 8CR-3 at the initiation of the forward travel of carriage 17 from the unloading position as described above.

When engaged glass sheet G is moved away from stack S springs 74 move vacuum cups 22 in the direction of sheet G so that switch LS2 returns to its closed position thereby energizing coil 3CR for the closing of contacts 3CR-1, 3CR-3, 3CR-4 and 3CR-5 and the opening of contact 3CR-2. The closing of contact 3CR-1 has no effect on coil 8CR because contacts 9CR-1 and 10CR-1 are open. The opening of contact 3CR-2 does not deenergize coil 10CR because contact 10CR-2 is closed in the holding circuit. The closing of contacts 3CR-3, 3CR-4, and 3CR-5 has no effect at this time on coils 14CR and 15CR because contact 8CR-3 is open as mentioned above.

When air cylinder 64 is operated to retract piston rod 63 cam 77 moves away from switch LS3 so it closes and cam 76 moves into engagement with switch LS7 so that it is closed. The closing of switch LS7 has no effect on coil 10CR which is already energized and maintained in that condition through its holding circuit. The closing of switch LS3 energizes coil 4CR to open contact 4CR-1, so that now only the holding circuit containing closed contact 9CR-2 maintains coil 9CR energized, and to close contact 4CR-2. Although contact 5CR-2 is also closed, contact 9CR-5 is open so that solenoid SV3-B is not energized by the closing of contact 4CR-2.

During further reverse travel of carriage 17 switch LS14 is tripped closed so that coil 21CR can be energized later when coil 8CR is energized to initiate the forward travel after carriage 17 is at the unloading position and sheet G has been released from cups 22.

Further travel of carriage 17 in the reverse direction results in the tripping open of switch LS12 but switch LS13 was tripped closed, as described above, when tilting frame was moved to the horizontal position by the operation of air cylinder 43. Of course, if switch LS13 were not closed, i.e., if frame 19 is not horizontal, the opening of switch LS12 would result in the deenergization of coil 20CR to stop motor 18.

During subsequent reverse travel of carriage 17 switch LS4 is tripped open for the deenergization of coil 5CR to open contact 5CR-2. Thus, solenoid SV3-B is not energized when coil 9CR is deenergized later to close contact 9CR-5. Of course, switch LS4 is closed during the forward travel for the reason which has been described earlier.

When carriage 17 approaches the unloading position switch LS5 is tripped open to deenergize coil 6CR thereby opening contact 6CR-1 and closing contact 6CR-2. As a result coil 16CR is deenergized and coil 17CR is energized. The energization of coil 17CR results in the flow of current through the rheostat having the higher electrical resistance so that the lesser current flows through the generator field winding of generator GEN-1. The lower constant voltage is now provided to armature M1 by generator GEN-1. The motor 18 operates now at the crawl speed until it arrives at the unloading position where switch LS6 is tripped open to deenergize coil 7CR. The contact 7CR-1 opens to deenergize coil 9CR thereby dropping out its holding circuit including contact 9CR-2. The contact 9CR-1 closes but coil 8CR cannot be energized because contact 10CR-1 is still open. The contact 9CR-3 opens to deenergize coil 17CR so that current no longer flows through either rheostat to the generator field winding of generator GEN-1. The contact 9CR-4 opens but contact 5CR-1 closed when switch LS4 was tripped open, so that solenoid SV3-A remains energized. The contact 9CR-5 closes but contact 5CR-2 is open so that the energization of solenoid SV3-B is prevented.

In addition to the opening of contact 9CR-3, contact 7CR-3 opens to deenergize coil 17CR. The contact 7CR-4 opens to deenergize coil 18CR for the stopping of the motor drive for conveyor 12 unless contact 2TR-2 is now closed. The effect of the energized or deenergized state of relay 2TR will be discussed later.

The deenergization of coil 9CR opens contact 9CR-6 for the deenergization of coil 20CR thereby opening contacts 20CR-1, 20CR-2, and 20CR-3 and closing contact 20CR-4. Current no longer flows through armature M1. The motor 18 stops. The carriage 17 is at the unloading position.

If a glass sheet G is on conveyor 12 so that either one of limit switches LS9 and LS10 is closed, coil 2TR is energized. It has been assumed that no glass has been placed on conveyor 12 and this would be the case in the first complete cycle of operation of the apparatus. However, let us assume that a glass sheet G is on conveyor 12 and has been moved off of switch LS9 so that it is now open but is still on switch LS10 so that it is closed. With coil 2TR energized contacts 2TR-1 and 2TR-2 are closed so that the opening of contact 7CR-2 does not deenergize coil 10CR and the opening of contact 7CR-4 does not deenergize coil 18CR when coil 7CR is deenergized upon the arrival of carriage 17 at the unloading position to trip open switch LS6. Because of the continued energization of coil 18CR contact 18CR-1 is closed in a holding circuit for coil 10CR. The switch LS10 opens after glass sheet G passes beyond it. After a delay coil 2TR is deenergized and contacts 2TR-1 and 2TR-2 open to deenergize coils 10CR and 18CR. Of course, if contact 2TR-1 opens before contact 2TR-2, coil 18CR is still energized after contact 2TR-1 opens. Then contact 18CR-1 opens after contact 2TR-2 opens to deenergize coil 18CR. The coil 10CR is deenergized when contact 18CR-1 opens. With this arrangement coil 10CR cannot be deenergized until there is no glass sheet G on conveyor 12 below the engaged glass sheet G supported by vacuum frame 20 with carriage 17 at the unloading position.

When coil 10CR is deenergized, its holding circuit drops out and contact 10CR-2 opens. The contact 10CR-3 opens to deenergize coil 1TR and solenoid SV1-A. At the same time contact 10CR-4 closes to energize solenoid SV1-B because contact 11CR-2 is still closed. Thus, the air source is placed in communication with hoses 73 and vacuum cups 22 to release glass sheet G which has been moved to the unloading position by engagement with a vacuum frame 20 from stack S. The released sheet G falls a very short distance onto conveyor 12, which is not operating because coil 18CR is deenergized. After the delay of relay having coil 1TR contact 1TR-1 opens. The sheet G now on conveyor 12 closes switch LS9 to energize coil 2TR thereby closing contact 2TR-1 which is now ineffective to energize coil 10CR, and to close contact 2TR-2 for the energization of coil 18CR so that the motor for conveyor 12 now starts to operate. The deposited sheet G is moved along conveyor 12. During this travel of sheet G on conveyor 12 switch LS10 is closed by sheet G before switch LS9 opens. The energization of coil 2TR thus continues and closed contact 2TR-2 provides for the continued energization of coil 8CR. The switch LS10 opens when sheet G passes beyond it. The coil 2TR is deenergized so that after a delay contact 2TR-2 opens. This results in the deenergization of coil 18CR to stop the motor for conveyor 12 unless contact 7CR-4 is closed. If carriage 17 is still at the unloading position, switch LS6 is open so that contact 7CR-4 is open because coil 7CR is deenergized.

As mentioned above, coil 1TR is deenergized when contact 10CR-3 is opened. After a delay contact 1TR-1 opens to deenergize coil 11CR so that contact 11CR-1 closes to energize coil 8CR because contacts 10CR-1, 3CR-1 and 9CR-1 are now closed. The energization of coil 8CR initiates a second cycle of operation of the apparatus, just as the initial closing of contact 1CR-2 initiated the energization of coil 8CR to start the first cycle of operation which has been described above. As described earlier, the energization of coil 8CR results in the operation of motor 18 to move carriage 17 forward from the unloading position to the unstacking position.

After all of the glass sheets G have been removed from stack S switch LS16 is open. When the last sheet G of that stack S has been released from vacuum frame 20 carriage 17 starts forward for a next cycle of operation. The switch LS15 will be closed prior to the opening of switch LS14. However, when switch LS14 is opened coil 21CR is deenergized because switch LS16 is open. In this case further forward travel of carriage 17 automatically stops. Of course, an operator can anticipate this by rotating turntable 180 degrees after the last sheet G is removed. The operator does this while carriage 17 is at or near the unloading position to present another stack S mounted on the other inclined side of turntable 11 to trip switch LS16 closed. This is accomplished by the operator closing momentarily the switch that has contacts 5PB-1 and 5PB-2 for the energization of coil 19CR that results in the operation of motor 89. The contacts 5PB-1 and 5PB-2 are held in closed position only long enough for motor 89 to move dog 92 away from switch LS11. The energization of coil 19CR continues through the holding circuit containing now closed contact 19CR-1 and switch LS11, which closed when dog 92 adjacent the first inclined side was moved away. When the other dog 92 trips open limit switch LS11, coil 19CR is deenergized. This happens when a second inclined side 93 faces conveyor 12. The operator can also rotate table 11, after motor 18 has been stopped automatically during its forward drive of carriage 17 as described above. This presents the new stack S for unstacking. Of course, the operator can stop motor 89 anytime by opening momentarily pushbutton switch 6PB.

When a stack S is being unstacked from the inclined side which faces conveyor 12, another stack S can be mounted on the other side in a conventional manner so that the stack will rest on the spaced pair of stools 21.

In the circuitry of composite FIG. 5 there are provided switches 3PB and 4PB. The switch 3PB can be manually closed to energize coil 8CR for the forward drive of carriage 17 provided contacts 3CR–1, 9CR–1, and 10CR–1 are closed. Similarly, switch 4PB can be manually closed to energize coil 9CR for the reverse travel of carriage 17 so long as contacts 7CR–1 and 8CR–2 are closed. So long as the reverse drive is not being used, the closing of switch 3PB will start the forward drive provided coil 10CR is not energized. Similarly, the reverse drive can be started by closing switch 4PB so long as the forward drive is not in operation.

The foregoing has been a description of the preferred embodiment of the apparatus of the present invention. Various modifications will be apparent to one skilled in the art from the description and the drawings. The preferred embodiment is presented solely for purposes of illustration and not by way of limitation. The invention is limited only by the claims which follow.

I claim:

1. An apparatus for removing glass sheets from a stack of glass sheets which comprises a table with an inclined side, a pair of stools mounted on the table to support the stack with the rear of the stack resting against the inclined side and with the bottom of each glass sheet forward of its top, a supporting structure, a carriage mounted on the supporting structure for horizontal movement, power means to move horizontally said carriage between a first position and other positions closer to said table than the first position, a tilting frame mounted on said carriage for pivotal movement about a horizontal axis, power means to pivotally move said tilting frame between a horizontal position and an inclined position, a vacuum frame, means mounted on said tilting frame to support said vacuum frame for movement of said vacuum frame relative to said tilting frame simultaneously in a vertical direction, a horizontal direction and about an axis parallel to the axis of pivotal movement of said tilting frame, vacuum cups mounted on said vacuum frame and having their sheet-engaging surfaces in a common plane, and power means to move said vacuum frame with said relative movement between a first position and a second position, said common plane being parallel to said inclined side in the first position of the vacuum frame and inclined to a greater degree than said inclined side and the vacuum frame being further away from said inclined side in the second position with said tilting frame in the inclined position.

2. The apparatus of claim 1 and further including conveyor means to move glass sheets in a horizontal path and positioned to receive a glass sheet released by the vacuum cups with the carriage at the first position, with the tilting frame at the horizontal position and with the vacuum frame at the first position.

3. The apparatus of claim 2 wherein each stool has an upper surface which is inclined downwardly in a manner so that the bottom edge of one glass sheet of the stack is below the bottom edge of the rearwardly adjacent glass sheet.

4. An apparatus for removing glass sheets from a stack of glass sheets which comprise a table with an inclined side, a pair of stools mounted on the table to support the stack with the rear of the stack resting against the inclined side and with the bottom of each glass sheet forward of its top, a supporting structure, a carriage mounted on the supporting structure for horizontal movement, first actuated power means to move horizontally said carriage between a first position and other positions closer to said table than the first position, a tilting frame mounted on said carriage for pivotal movement about a horizontal axis normal to the movement of said carriage, second actuated power means to pivotally move said tilting frame between a horizontal position and an inclined position, a vacuum frame, means mounted on said tilting frame to support said vacuum frame for movement of said vacuum frame relative to said tilting frame simultaneously in a vertical direction, a horizontal direction and about an axis parallel to the axis of pivotal movement of said tilting frame, vacuum cups resiliently mounted on said vacuum frame for movement between a first position and a second position and having their sheet-engaging surfaces in a common plane, actuated means to communicate said vacuum cups with a vacuum source, actuated means to communicate said vacuum cups with a pressurized air source, third actuated power means to move said vacuum frame with said relative movement between a first position and a second position, said common plane being parallel to said inclined side in the first position of the vacuum frame and inclined to a greater degree than said inclined side and the vacuum frame being further away from said inclined side in the second position with said tilting frame in the inclined position, conveyor means to move glass sheets in a horizontal path and positioned to receive a glass sheet released by the vacuum cups with the carriage at the first position, with the tilting frame at the horizontal position and with the vacuum frame at the first position, means responsive to movement of said vacuum cups from the first position to the second position upon abutment of said cups against the stack to stop actuation of said first power means for stopping said carriage at one of said other positions and to actuate said means to communicate said cups with the vacuum source, means responsive to decreased pressure in said vacuum cups to actuate said third power means for movement of the vacuum frame from the first position to the second position, means responsive to the vacuum frame at the second position to actuate the first power means for movement of the carriage from one of the other positions to the first position, means responsive to the movement of the carriage from one of the other positions to the first position to actuate the second power means for movement of the tilting frame from the inclined position to the horizontal position, means responsive to movement of the carriage from one of the other positions to the first position to actuate the third power means to move the vacuum frame from the second position to the first position, means responsive to the arrival of the carriage at the first position to actuate the means to communicate said vacuum cups to the pressurized air source, means responsive to the actuation of the means to communicate the vacuum cups with the pressurized air source to actuate the first power means to move the carriage from the first position toward the other positions and means responsive to the movement of said carriage toward the other positions to actuate the second power means for movement of the tilting frame from the horizontal position to the inclined position.

5. The apparatus of claim 4 wherein the actuating means for the first power means to move the carriage from the first position toward the other positions is operative only until the carriage reaches an intermediate position between the first position and said other positions and said apparatus further including means responsive to a glass sheet resting on the inclined side of said table and means responsive to movement of said carriage through the intermediate position and to said other position to provide in cooperation with said glass sheet-responsive means for continued actuation of said first power means at the intermediate position of said carriage whereby the carriage continues to move toward one of said other positions.

6. The apparatus of claim 5 wherein the table is a turntable having two inclined sides and two pairs of stools mounted on the turntable whereby a stack can be loaded on one inclined side of the table during the removal of sheets from a stack on the other inclined side and said apparatus further including fourth power means to rotate said table about a vertical axis and means to index each inclined side in sequence at a removal position where said vacuum cups can engage the stack.

7. The apparatus of claim 6 wherein each stool has an upper surface which is inclined downwardly in a manner so that the bottom edge of one glass sheet of the stack at the removal position is below the bottom edge of the rearwardly adjacent glass sheet.

8. The apparatus of claim 5 wherein said supporting structure supports a pair of horizontal rails and a pair of racks, said carriage has wheels on said rails, said first power means includes a motor mounted on said carriage, and gears rotatably mounted on said carriage, rotated by said motor and meshing with said racks, said tilting frame includes a pair of plates and a first horizontal shaft keyed to said plates, said second power means includes a first air cylinder mounted on said carriage and having a first piston rod and a crank arm pivotally connected to said first piston rod and keyed on said shaft, and said supporting means for said vacuum frame includes a second horizontal shaft rotatably mounted on one end of said vacuum frame, a pair of links keyed on said second shaft and mounted on said tilting frame for pivotal movement about a horizontal axis parallel to the axis of rotation of said second shaft and a pair of cam followers mounted on said vacuum frame at an opposite end and said third power means including a second air cylinder pivotally mounted on said vacuum frame and having a second piston rod, and a crank arm keyed on said second shaft and pivotally connected to said second piston rod, said plates of said tilting frame having cam slots in which cam followers are located and said cam slots being shaped to provide a movement of said cam followers in said slots upon operation of said second air cylinder whereby with said tilting frame in the inclined position said vacuum frame at an upper portion moves in a horizontal direction less than an upper portion of said vacuum frame is moved by movement of said links to produce a greater inclination of said frame.

9. An apparatus for removing glass sheets from a stack of glass sheets which comprises a table with an inclined side adapted to support said stack with the bottom of each glass sheet forward of its top, a supporting structure, a carriage mounted on said structure for horizontal movement, means to move said carriage horizontally between a first position and other positions closer to said table than the first position, a tilting frame mounted on said carriage for pivotal movement about a horizontal axis, means to pivot said tilting frame between a horizontal position and an inclined position, a vacuum frame, means to support said vacuum frame on said tilting frame, means to move said vacuum frame relative to said tilting frame simultaneously in a vertical direction and about an axis parallel to the axis of pivotal movement of said tilting frame, vacuum heads mounted on said vacuum frame and having their sheet-engaging surfaces in a common plane, and means to move said vacuum frame with said relative movement between a first position and a second position, said common plane being parallel to said inclined side in the first position and inclined to a greater degree than said inclined side in the second position.

References Cited in the file of this patent

UNITED STATES PATENTS

| | | |
|---|---|---|
| 2,049,850 | Lytle | Aug. 4, 1936 |
| 2,601,250 | Bruns | June 24, 1952 |
| 2,609,108 | Peterson | Sept. 2, 1952 |
| 2,619,237 | Socke | Nov. 25, 1952 |
| 2,838,898 | Owen | June 17, 1958 |